US010838770B2

(12) United States Patent
Nutter et al.

(10) Patent No.: US 10,838,770 B2
(45) Date of Patent: *Nov. 17, 2020

(54) MULTI-SYSTEM EVENT RESPONSE CALCULATOR AND RESOURCE ALLOCATOR

(71) Applicant: BANK OF AMERICA CORPORATION, Charlotte, NC (US)

(72) Inventors: Darla Nutter, Minnetonka, MN (US); Angelyn Marie Day, Charlotte, NC (US); Clifford Todd Barnett, Charlotte, NC (US); John J. Towey, Jr., Farmingdale, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,043

(22) Filed: Jan. 29, 2020

(65) Prior Publication Data
US 2020/0167203 A1 May 28, 2020

Related U.S. Application Data

(63) Continuation of application No. 15/660,381, filed on Jul. 26, 2017.

(51) Int. Cl.
G06F 9/50 (2006.01)
G06N 5/04 (2006.01)
H04L 12/911 (2013.01)

(52) U.S. Cl.
CPC .......... G06F 9/5055 (2013.01); G06F 9/5061 (2013.01); G06N 5/04 (2013.01); H04L 47/823 (2013.01)

(58) Field of Classification Search
CPC ........ G06F 9/5055; G06N 5/04; H04L 47/823
See application file for complete search history.

(56) References Cited

U.S. PATENT DOCUMENTS 6,349,290 B1    2/2002  Horowitz et al.
6,560,631 B1 *  5/2003  Ishihara ................ G06F 16/134
                                            709/201
(Continued)

OTHER PUBLICATIONS

Pannkuk, Lois and Bauman, Dodie Avoiding the perils of noncompliance. ABA Bank Compliance v22n5 pp. 40-52 May/Jun. 2001.
(Continued)

Primary Examiner — Jorge A Chu Joy-Davila
(74) Attorney, Agent, or Firm — Michael A. Springs; Moore & Van Allen PLLC; James C. Edwards

(57) ABSTRACT

Embodiments analyze historical events to calculate the impact of multi-system events and, in response, allocate resources. Embodiments determine a multi-system event is occurring based on historical multi-system event data; correlate the multi-system event with one or more predicted resource allocation results of the multi-system event based on historical multi-system event data; and in response to the correlation, initiate mitigation of the one or more predicted resource allocation results, including re-allocation of at least one affected resource to a new system. Some also determine current consumption of a resource utilized by a service; determine current processing throughput; calculate a relationship between consumption of the resource and processing throughput; determine the service is impacted by the multi-system event; calculate expected processing throughput in response to the multi-system event; and calculate expected consumption of the resource based on the calculated expected processing throughput and the calculated relationship.

20 Claims, 6 Drawing Sheets

(56) References Cited

U.S. PATENT DOCUMENTS

| | | |
|---|---|---|
| 6,782,421 B1 | 8/2004 | Soles et al. |
| 7,225,051 B1 | 5/2007 | Christensen et al. |
| 7,305,351 B1 | 12/2007 | Bechhofer et al. |
| 7,313,531 B2 | 12/2007 | Chappel et al. |
| 7,493,277 B1 | 2/2009 | Uhl et al. |
| 7,505,918 B1 | 3/2009 | Spielmann et al. |
| 7,523,053 B2 | 4/2009 | Pudhukottai et al. |
| 7,853,468 B2 | 12/2010 | Callahan et al. |
| 8,041,797 B2 | 10/2011 | Childress et al. |
| 8,078,913 B2 | 12/2011 | Goldszmidt et al. |
| 8,196,207 B2 | 6/2012 | Hill et al. |
| 8,256,004 B1 | 8/2012 | Hill et al. |
| 8,265,980 B2 | 9/2012 | Ochs et al. |
| 8,392,237 B2 | 3/2013 | Gupta |
| 8,417,499 B2 | 4/2013 | Chen et al. |
| 8,700,415 B2 | 4/2014 | Venzon et al. |
| 8,843,621 B2 | 9/2014 | DeJana et al. |
| 9,311,611 B2 | 4/2016 | Suer et al. |
| 2002/0018269 A1 | 2/2002 | Chaudhuri et al. |
| 2002/0030864 A1 | 3/2002 | Chaudhuri et al. |
| 2002/0042687 A1 | 4/2002 | Tracy et al. |
| 2002/0059093 A1 | 5/2002 | Barton et al. |
| 2002/0109879 A1 | 8/2002 | So |
| 2002/0120642 A1 | 8/2002 | Fetherston |
| 2002/0188182 A1 | 12/2002 | Haines et al. |
| 2003/0018513 A1 | 1/2003 | Hoffman et al. |
| 2003/0028412 A1 | 2/2003 | Hoffman et al. |
| 2003/0040986 A1 | 2/2003 | Hoffman et al. |
| 2003/0041001 A1 | 2/2003 | Hoffman et al. |
| 2003/0046089 A1 | 3/2003 | Menninger et al. |
| 2003/0046120 A1 | 3/2003 | Hoffman et al. |
| 2003/0046121 A1 | 3/2003 | Menninger et al. |
| 2003/0046136 A1 | 3/2003 | Hoffman et al. |
| 2003/0046190 A1 | 3/2003 | Hoffman et al. |
| 2003/0046214 A1 | 3/2003 | Menninger |
| 2003/0048301 A1 | 3/2003 | Menninger |
| 2003/0050807 A1 | 3/2003 | Hoffman et al. |
| 2003/0050808 A1 | 3/2003 | Mor |
| 2003/0050809 A1 | 3/2003 | Hoffman et al. |
| 2003/0050822 A1 | 3/2003 | Hoffman et al. |
| 2003/0050823 A1 | 3/2003 | Gehman et al. |
| 2003/0050828 A1 | 3/2003 | Hoffman et al. |
| 2003/0050845 A1 | 3/2003 | Hoffman et al. |
| 2003/0050859 A1 | 3/2003 | Rodriguez et al. |
| 2003/0050867 A1 | 3/2003 | Menninger et al. |
| 2003/0050868 A1 | 3/2003 | Hoffman et al. |
| 2003/0055692 A1 | 3/2003 | Menninger |
| 2003/0055693 A1 | 3/2003 | Hoffman et al. |
| 2003/0055694 A1 | 3/2003 | Menninger |
| 2003/0055700 A1 | 3/2003 | Hoffman et al. |
| 2003/0055704 A1 | 3/2003 | Reece |
| 2003/0055708 A1 | 3/2003 | Hoffman et al. |
| 2003/0055709 A1 | 3/2003 | Hoffman et al. |
| 2003/0055710 A1 | 3/2003 | Burk et al. |
| 2003/0055731 A1 | 3/2003 | Fouraker et al. |
| 2003/0055734 A1 | 3/2003 | Hoffman et al. |
| 2003/0055750 A1 | 3/2003 | Menninger |
| 2003/0061084 A1 | 3/2003 | Menninger |
| 2003/0061102 A1 | 3/2003 | Menninger et al. |
| 2003/0061124 A1 | 3/2003 | Menninger et al. |
| 2003/0061125 A1 | 3/2003 | Hoffman et al. |
| 2003/0061130 A1 | 3/2003 | Hoffman et al. |
| 2003/0061174 A1 | 3/2003 | Menninger |
| 2003/0065541 A1 | 4/2003 | Menninger |
| 2003/0065549 A1 | 4/2003 | Hoffman et al. |
| 2003/0065550 A1 | 4/2003 | Hoffman et al. |
| 2003/0065551 A1 | 4/2003 | Hoffman et al. |
| 2003/0065557 A1 | 4/2003 | Hoffman et al. |
| 2003/0065627 A1 | 4/2003 | Menninger |
| 2003/0066886 A1 | 4/2003 | Hoffman et al. |
| 2003/0069765 A1 | 4/2003 | Menninger |
| 2003/0069766 A1 | 4/2003 | Hoffman et al. |
| 2003/0069767 A1 | 4/2003 | Menninger |
| 2003/0069768 A1 | 4/2003 | Hoffman et al. |
| 2003/0069769 A1 | 4/2003 | Hoffman et al. |
| 2003/0069770 A1 | 4/2003 | Burk et al. |
| 2003/0069771 A1 | 4/2003 | Menninger et al. |
| 2003/0069774 A1 | 4/2003 | Hoffman et al. |
| 2003/0069778 A1 | 4/2003 | Menninger et al. |
| 2003/0069779 A1 | 4/2003 | Menninger et al. |
| 2003/0069786 A1 | 4/2003 | Hoffman et al. |
| 2003/0069791 A1 | 4/2003 | Menninger |
| 2003/0069794 A1 | 4/2003 | Hoffman et al. |
| 2003/0069798 A1 | 4/2003 | Hoffman |
| 2003/0069799 A1 | 4/2003 | Hoffman et al. |
| 2003/0069813 A1 | 4/2003 | Burk |
| 2003/0069814 A1 | 4/2003 | Hoffman et al. |
| 2003/0069818 A1 | 4/2003 | Menninger |
| 2003/0069823 A1 | 4/2003 | Hoffman et al. |
| 2003/0069824 A1 | 4/2003 | Menninger |
| 2003/0069825 A1 | 4/2003 | Hoffman et al. |
| 2003/0069859 A1 | 4/2003 | Hoffman et al. |
| 2003/0074205 A1 | 4/2003 | Menninger |
| 2003/0074206 A1 | 4/2003 | Hoffman et al. |
| 2003/0074237 A1 | 4/2003 | Sechrist et al. |
| 2003/0074238 A1 | 4/2003 | Hoffman et al. |
| 2003/0074239 A1 | 4/2003 | Hoffman et al. |
| 2003/0074249 A1 | 4/2003 | Hoffman et al. |
| 2003/0074250 A1 | 4/2003 | Burk |
| 2003/0074262 A1 | 4/2003 | Hoffman et al. |
| 2003/0074263 A1 | 4/2003 | Hoffman et al. |
| 2003/0074264 A1 | 4/2003 | Hoffman |
| 2003/0074281 A1 | 4/2003 | Hoffman et al. |
| 2003/0074285 A1 | 4/2003 | Hoffman et al. |
| 2003/0074355 A1 | 4/2003 | Menninger et al. |
| 2003/0078787 A1 | 4/2003 | Hoffman et al. |
| 2003/0078818 A1 | 4/2003 | Hoffman et al. |
| 2003/0078819 A1 | 4/2003 | Hoffman et al. |
| 2003/0078827 A1 | 4/2003 | Hoffman |
| 2003/0078845 A1 | 4/2003 | Hoffman et al. |
| 2003/0078846 A1 | 4/2003 | Burk et al. |
| 2003/0078860 A1 | 4/2003 | Hoffman et al. |
| 2003/0078861 A1 | 4/2003 | Hoffman et al. |
| 2003/0083909 A1 | 5/2003 | Hoffman et al. |
| 2003/0083918 A1 | 5/2003 | Hoffman et al. |
| 2003/0083947 A1 | 5/2003 | Hoffman et al. |
| 2003/0088449 A1 | 5/2003 | Menninger |
| 2003/0088474 A1 | 5/2003 | Hoffman et al. |
| 2003/0097317 A1 | 5/2003 | Burk et al. |
| 2003/0153991 A1 | 8/2003 | Visser et al. |
| 2003/0158800 A1 | 8/2003 | Pisello et al. |
| 2003/0229525 A1 | 12/2003 | Callahan et al. |
| 2004/0068431 A1 | 4/2004 | Smith et al. |
| 2004/0093298 A1 | 5/2004 | McClure, III et al. |
| 2004/0193482 A1 | 9/2004 | Hoffman et al. |
| 2004/0236621 A1 | 11/2004 | Eder |
| 2005/0060245 A1 | 3/2005 | Hoffman et al. |
| 2005/0071185 A1 | 3/2005 | Thompson |
| 2005/0075916 A1 | 4/2005 | Lathram et al. |
| 2005/0086530 A1 | 4/2005 | Goddard |
| 2006/0015416 A1 | 1/2006 | Hoffman et al. |
| 2006/0053043 A1 | 3/2006 | Clarke |
| 2006/0059253 A1 | 3/2006 | Goodman et al. |
| 2006/0064481 A1 | 3/2006 | Baron et al. |
| 2006/0064485 A1 | 3/2006 | Baron et al. |
| 2006/0064486 A1 | 3/2006 | Baron et al. |
| 2006/0074700 A1 | 4/2006 | Ricketts |
| 2006/0095915 A1 | 5/2006 | Clater |
| 2006/0161444 A1 | 7/2006 | Lubrecht et al. |
| 2006/0161879 A1 | 7/2006 | Lubrecht et al. |
| 2006/0185019 A1 | 8/2006 | Wong |
| 2006/0206246 A1 | 9/2006 | Walker |
| 2006/0282276 A1 | 12/2006 | Venzon et al. |
| 2007/0226099 A1 | 9/2007 | Senturk-Doganaksoy et al. |
| 2007/0226721 A1 | 9/2007 | Laight et al. |
| 2007/0288208 A1 | 12/2007 | Grigsby et al. |
| 2008/0015913 A1 | 1/2008 | Courtney et al. |
| 2008/0047016 A1 | 2/2008 | Spoonamore |
| 2008/0086342 A1 | 4/2008 | Curry et al. |
| 2008/0208667 A1 | 8/2008 | Lymbery et al. |
| 2008/0221944 A1 | 9/2008 | Kelly et al. |
| 2008/0222734 A1 | 9/2008 | Redlich et al. |
| 2008/0243524 A1 | 10/2008 | Agrawal et al. |
| 2008/0270448 A1 | 10/2008 | Brennan et al. |

(56) References Cited

U.S. PATENT DOCUMENTS

| | | |
|---|---|---|
| 2008/0288330 A1 | 11/2008 | Hildebrand et al. |
| 2009/0254572 A1 | 10/2009 | Redlich et al. |
| 2009/0265787 A9 | 10/2009 | Baudoin et al. |
| 2010/0010968 A1 | 1/2010 | Redlich et al. |
| 2012/0158678 A1 | 6/2012 | McGraw et al. |
| 2016/0050222 A1 | 2/2016 | Iyer et al. |
| 2016/0254943 A1 | 9/2016 | Maes |
| 2016/0380908 A1 | 12/2016 | Larsson et al. |
| 2017/0178039 A1 | 6/2017 | Pinkerton et al. |
| 2017/0308363 A1 | 10/2017 | Barsness et al. |

OTHER PUBLICATIONS

Monson, Keith E., (Sep. 2004). Compliance Risk-Rating Solutions. ABA Bank Compliance, 25(9), 14-25.

Kim Henry M. and Fox Mark S., Using Enterprise Reference Models for Automated ISO 9000 Compliance Evaluation, Proceedings of the 35 Annual Hawaii International Conference on System Sciences 2002 IEEE.

Alberts, Christopher J. and Dorofee, Audrey J. Octave Criteria, Version 2.0 Dec. 2001, Technical Report CMEI 2001-TR-016.

Alberts, Christopher J. and Dorofee, Audrey J. and Allen, Julia H. Octave Catalog of Practices, Version 2.0 Oct. 2001.

Macharg, Marcia, Making the case for legal compliance audits. International Financial Law Review v16n4 pp. 9 Apr. 1997.

* cited by examiner

CREATE THE RESPONSE DOCUMENT

| | |
|---|---|
| SERVICE ID: XXXX | SERVICE NAME: SERVICE |
| PRODUCING ENTITY/DISTRICT ENTITY/AREA | |
| FRONT-LINE UNIT | UNIT |
| CONSUMING ENTITY/DISTRICT ENTITY/AREA | |
| CONSUMING FRONT-LINE-UNIT | UNIT |
| CONSUMING SERVICE | SERVICE |
| SLAs | HIGHLY AVAILABLE (LESS THAN 1 HOUR) |
| | 24X7 |
| | GLOBAL |
| THROUGHPUT | # OF OCCURRENCES PER HOUR |
| | # OF USERS PER HOUR |
| RESOURCE A | 3 |
| PROCESSES | 19 |
| PEOPLE | 120 (DEDICATED) |
| PEOPLE | 100 (SHARED) |
| APPS | 6 |
| TECHNOLOGY INSTANCES | 90 |
| CONTRACTS/VENDORS | 5 |
| REAL ESTATE | 3 |
| REGULATION | 10 |
| CONSUMPTION | XX% |
| COST: | $XXXX |

PLAYBOOK

PLAYBOOK TITLE: RESOLUTION SERVICE FOR CONSUMING SERVICE

POSSIBLE EVENT EFFECTS
- EMPLOYEE UNAVAILABILITY
- CYBER
- PHYSICAL
- INFRASTRUCTURE FAILURE
- REPUTATIONAL
- LEGAL/REGULATORY
- FINANCIAL

RESPONSE TEAMS
- FINANCE
- HR
- LEGAL

IMMEDIATE KPI IMPACT: 9X

RESPONSE RESOLUTION TIME: 30 MINUTES

INTRODUCTION

IMPACT TYPE: STAFFING

ATTACH CONTRACTS
ATTACH DOCUMENTS

IMPACT AT INTERVALS:

IMPACT TYPE: TECHNOLOGY

RESPONSE CALCULATOR

| OCCURRENCE/HOUR | USERS PER HOUR | STAFFING | FINANCE | TECH COMPUTE | STORAGE | AND SO ON ...... |
|---|---|---|---|---|---|---|
| 1M<9M | 100K<900K | 120<200 | 12.2<15.9 | 30<60 | 10<15 | |

AND SO ON ......

FIGURE 5

MULTI-SYSTEM EVENT RESPONSE CALCULATOR AND RESOURCE ALLOCATOR

CROSS-REFERENCE TO RELATED APPLICATION

This application is a continuation of and claims priority from allowed, co-pending U.S. patent application Ser. No. 15/660,381 filed on Jul. 26, 2017 and entitled "Multi-System Event Response Calculator and Resource Allocator".

FIELD

In general, embodiments of the invention relate to methods, systems, apparatus and computer program products for analyzing historical events to calculate impact of multi-system event impact and, in response, allocate resources.

BACKGROUND

Oftentimes, a potential problem such as a fragmenting entity may cause multi-system disruption to resource distribution. Therefore, a need exists for a system that can identify potential problems so that the system may communicate and/or implement recommendations to/for administrators.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the invention provide systems, computer program products, methods and apparatuses for analyzing historical events to calculate impact of multi-system event impact and, in response, allocate resources. Some embodiments provide a system including a computer apparatus including a processor, a memory device, and a communication device; and a software module stored in the memory, comprising computer-readable instructions that when executed by the processor cause the processor to determine a multi-system event is occurring based on historical multi-system event data; correlate the multi-system event with one or more predicted resource allocation results of the multi-system event based on historical multi-system event data; and in response to the correlation, initiate mitigation of the one or more predicted resource allocation results, including re-allocation of at least one affected resource to a new system.

In some embodiments, the computer-readable instructions when executed by the processor further cause the processor to determine current consumption of a resource utilized by a service; determine current processing throughput; calculate a relationship between consumption of the resource and processing throughput; determine the service is impacted by the multi-system event; calculate expected processing throughput in response to the multi-system event; and calculate expected consumption of the resource based on the calculated expected processing throughput and the calculated relationship. In some such embodiments, the computer-readable instructions when executed by the processor further cause the processor to initiate re-allocation of resources to account for the calculated expected consumption of the resource. In other such embodiments, the computer-readable instructions when executed by the processor further cause the processor to initiate presentation of the calculated expected consumption of the resource to an administrator; and receive instructions from the administrator regarding desired mitigation.

In yet other such embodiments, the computer-readable instructions when executed by the processor further cause the processor to initiate presentation of the calculated expected consumption of the resource to an administrator; calculate a re-allocation of resources to account for the calculated expected consumption of the resource; and initiate presentation of the calculated re-allocation of resources for administration approval. In some of these embodiments, the computer-readable instructions when executed by the processor further cause the processor to receive administrator approval for implementing the re-allocation of resources; and in response, initiate re-allocation of resources.

In some embodiments, the at least one allocated resource comprises an electronic processing resource or an electronic memory resource.

According to some embodiments of the invention, a computer program product includes at least one non-transitory computer-readable medium having computer-readable program code portions embodied therein, and the computer-readable program code portions comprise an executable portion configured to determine a multi-system event is occurring based on historical multi-system event data; an executable portion configured to correlate the multi-system event with one or more predicted resource allocation results of the multi-system event based on historical multi-system event data; and an executable portion configured to, in response to the correlation, initiate mitigation of the one or more predicted resource allocation results, including re-allocation of at least one affected resource to a new system.

In some embodiments, the computer-readable program code portions further comprise an executable portion configured to determine current consumption of a resource utilized by a service; an executable portion configured to determine current processing throughput; an executable portion configured to calculate a relationship between consumption of the resource and processing throughput; an executable portion configured to determine the service is impacted by the multi-system event; an executable portion configured to calculate expected processing throughput in response to the multi-system event; and an executable portion configured to calculate expected consumption of the resource based on the calculated expected processing throughput and the calculated relationship. In some such embodiments, the computer-readable program code portions further comprise an executable portion configured to initiate re-allocation of resources to account for the calculated expected consumption of the resource. In other such embodiments, the computer-readable program code portions further comprise an executable portion configured to initiate presentation of the calculated expected consumption of the resource to an administrator; and an executable portion configured to receive instructions from the administrator regarding desired mitigation.

In yet other such embodiments, the computer-readable program code portions further comprise an executable portion configured to initiate presentation of the calculated expected consumption of the resource to an administrator; an executable portion configured to calculate a re-allocation of resources to account for the calculated expected consumption of the resource; and an executable portion configured to initiate presentation of the calculated re-allocation of resources for administration approval. In some of these embodiments, the computer-readable program code portions further comprise an executable portion configured to receive administrator approval for implementing the re-allocation of resources; and an executable portion configured to, in response, initiate re-allocation of resources.

In some embodiments, the at least one allocated resource comprises an electronic processing resource or an electronic memory resource.

According to some embodiments of the invention, a method comprises determining, using a processing device, a multi-system event is occurring based on historical multi-system event data; correlating, using the processing device, the multi-system event with one or more predicted resource allocation results of the multi-system event based on historical multi-system event data; and in response to the correlation, initiating, using the processing device, mitigation of the one or more predicted resource allocation results, including re-allocation of at least one affected resource to a new system.

In some embodiments, the method also includes determining, using the processing device, current consumption of a resource utilized by a service; determining, using the processing device, current processing throughput; calculating, using the processing device, a relationship between consumption of the resource and processing throughput; determining, using the processing device, the service is impacted by the multi-system event; calculating, using the processing device, expected processing throughput in response to the multi-system event; and calculating, using the processing device, expected consumption of the resource based on the calculated expected processing throughput and the calculated relationship. In some such embodiments, the method includes initiating, using the processing device, re-allocation of resources to account for the calculated expected consumption of the resource. In other such embodiments, the method includes initiating, using the processing device, presentation of the calculated expected consumption of the resource to an administrator; and receiving, using the processing device, instructions from the administrator regarding desired mitigation.

In yet other embodiments of the invention, the method includes initiating, using the processing device, presentation of the calculated expected consumption of the resource to an administrator; calculating, using the processing device, a re-allocation of resources to account for the calculated expected consumption of the resource; and initiating, using the processing device, presentation of the calculated re-allocation of resources for administration approval. In some such embodiments, the method also includes receiving, using the processing device, administrator approval for implementing the re-allocation of resources; and in response, initiating, using the processing device, re-allocation of resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
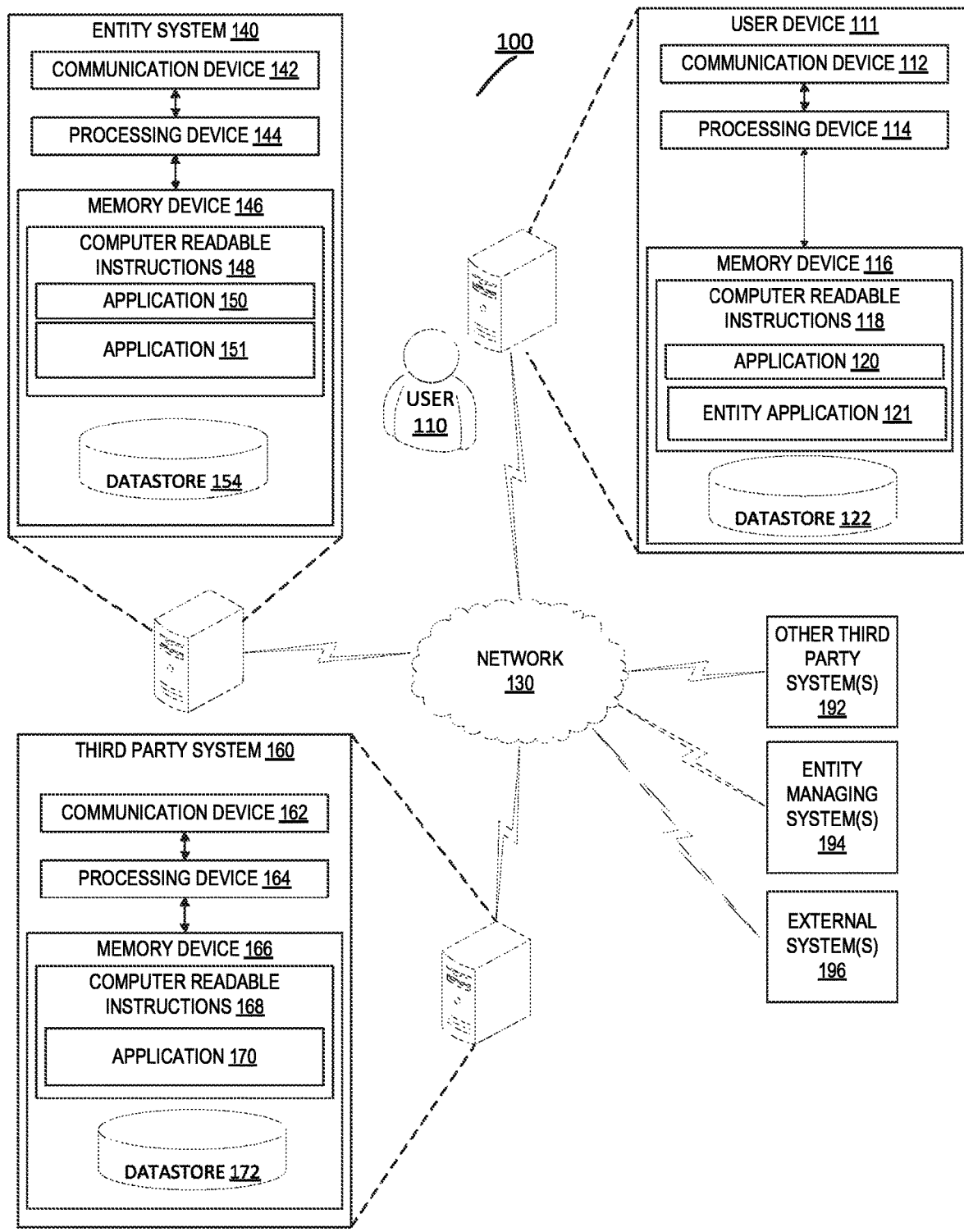
Figure 2:
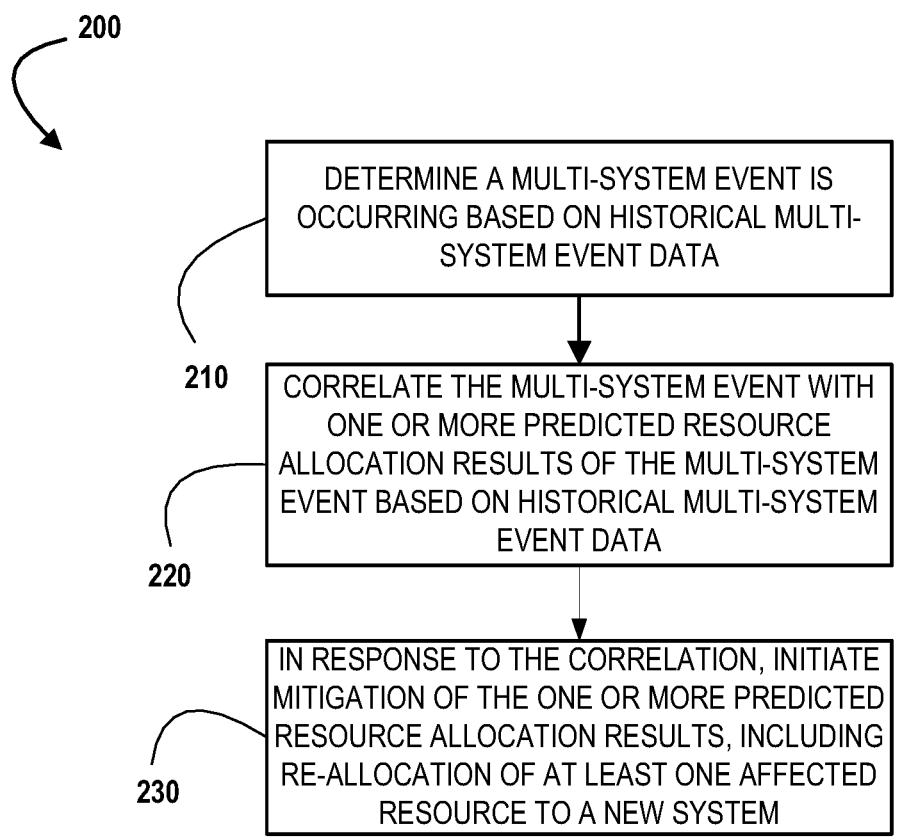
Figure 3:
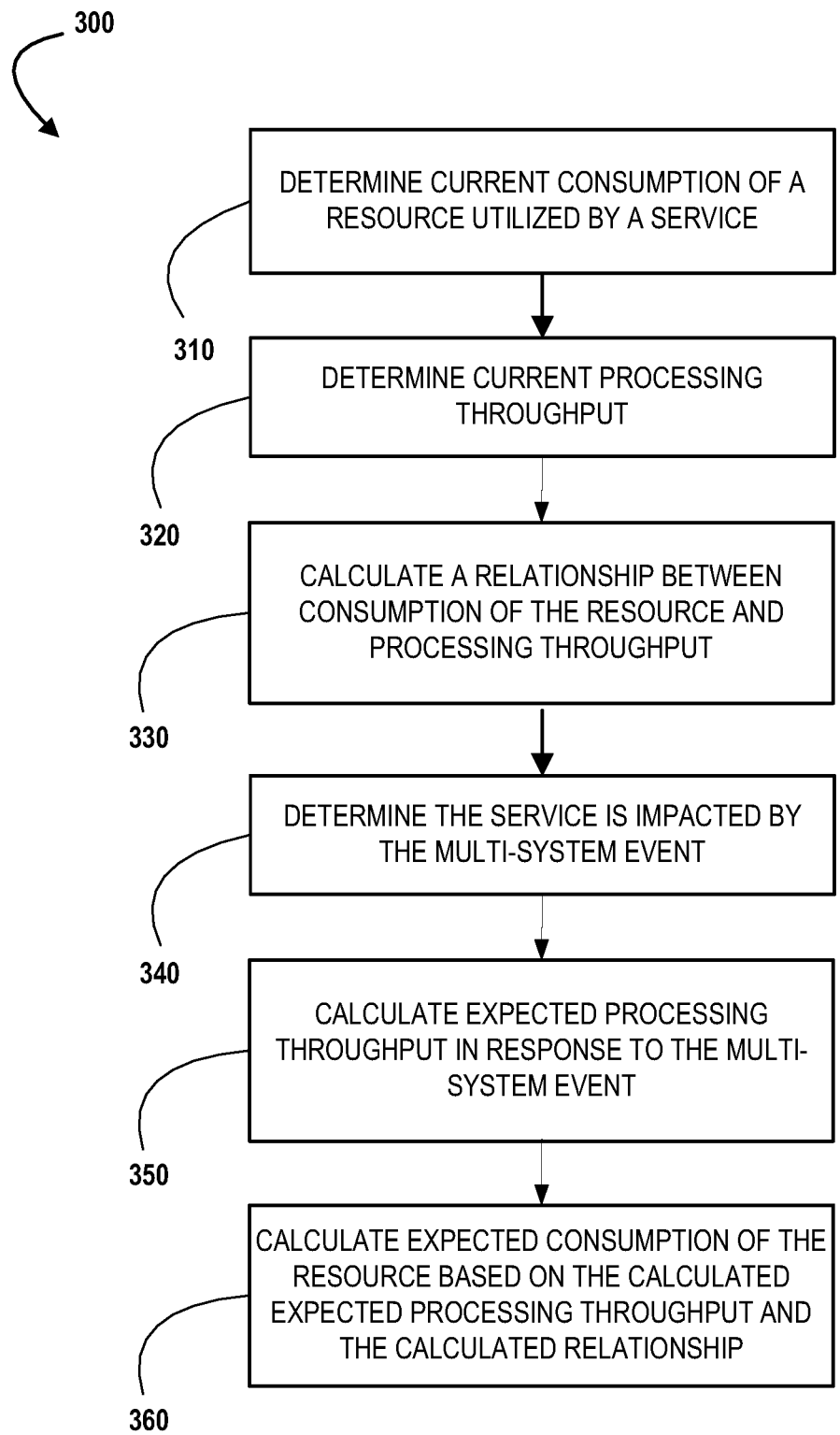
Figure 4:
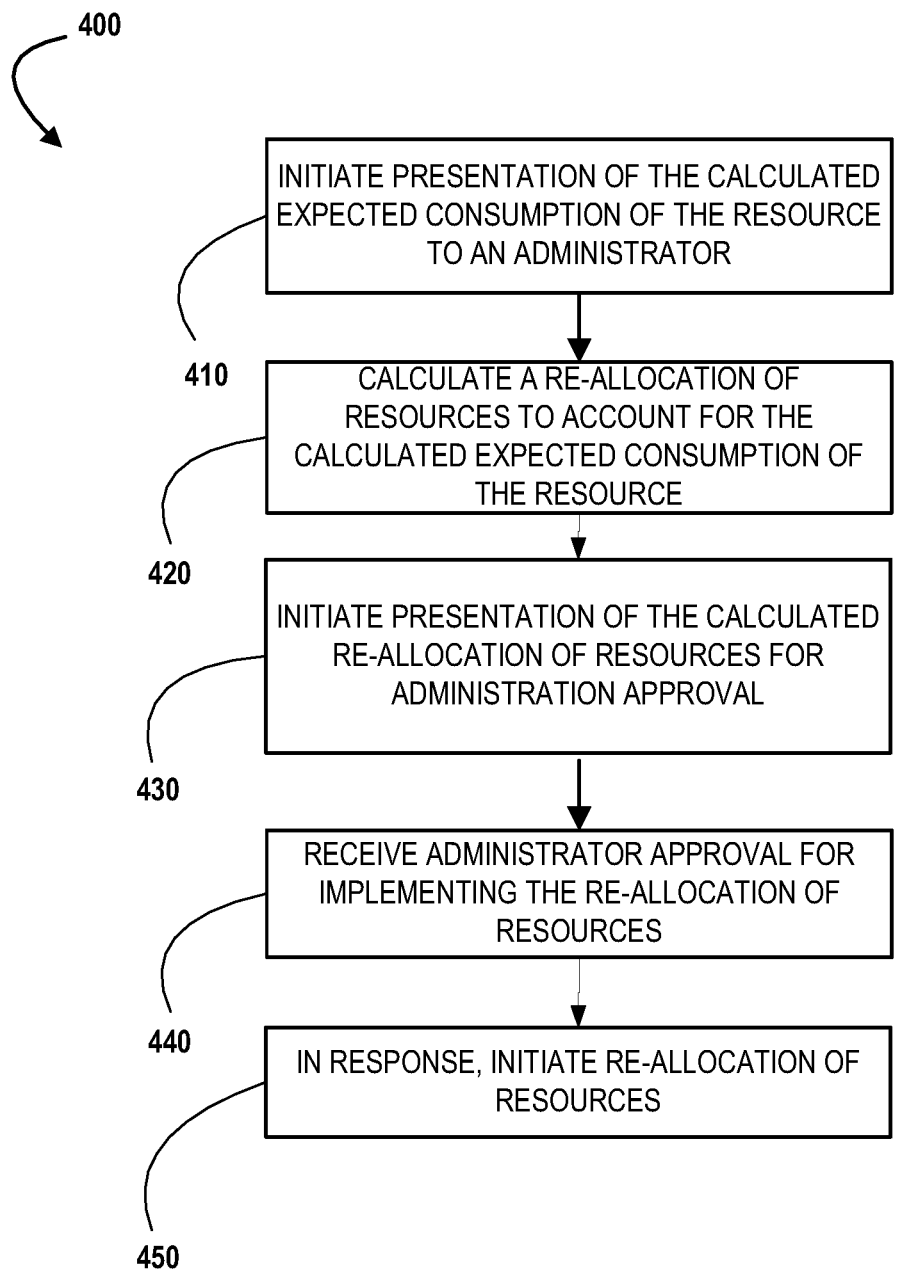
Figure 6:
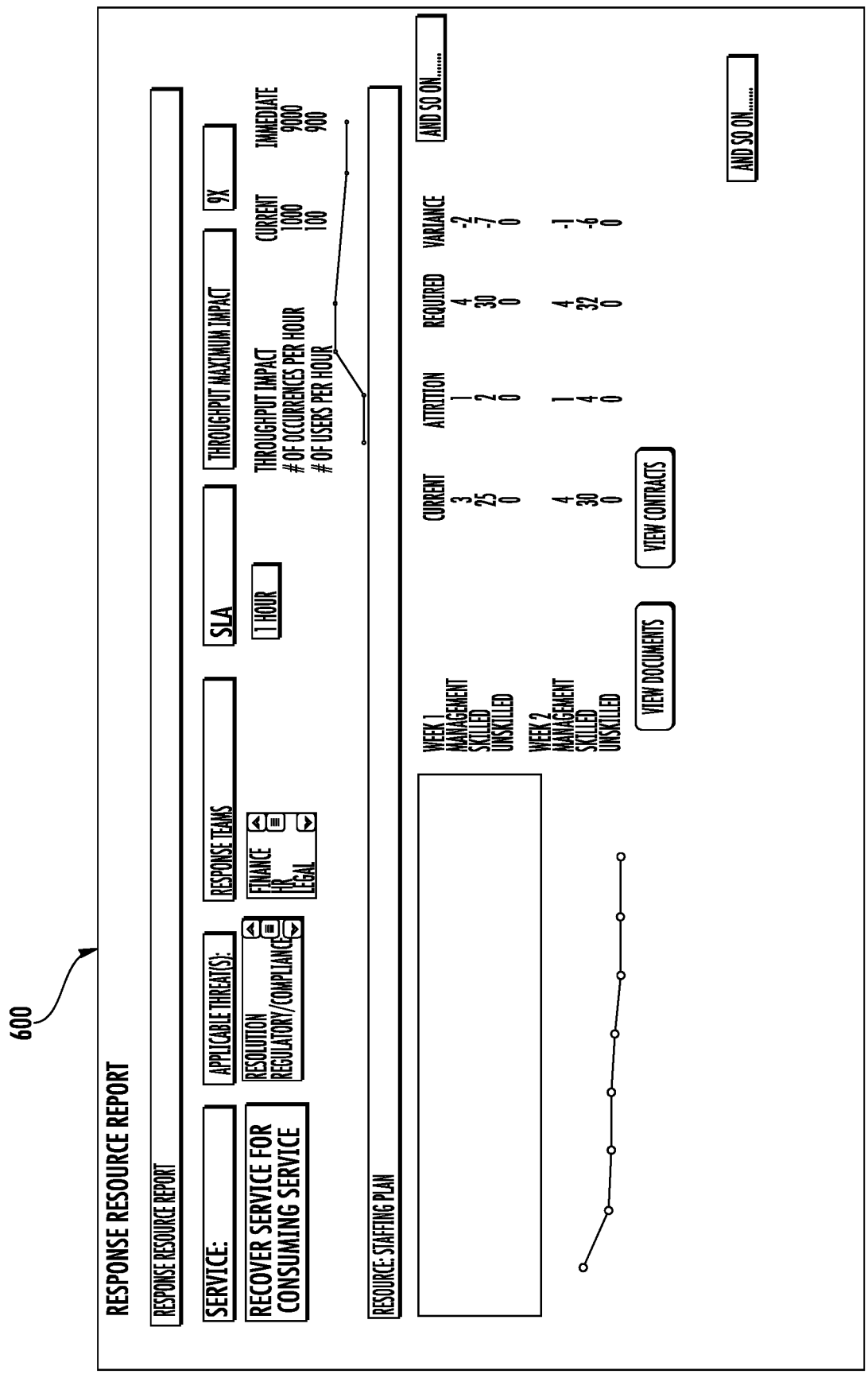

Having thus described embodiments of the invention in general terms, reference will now be made the accompanying drawings, wherein:

FIG. 1 provides a block diagram illustrating technical components of a system for analyzing historical events to calculate impact of multi-system event impact and, in response, allocate resources, in accordance with embodiments of the present invention;

FIG. 2 provides a flow diagram illustrating a process flow for analyzing historical events to calculate impact of multi-system event impact and, in response, allocate resources, in accordance with embodiments of the present invention;

FIG. 3 provides a flow diagram illustrating a process flow for analyzing historical events to calculate impact of multi-system event impact and, in response, allocate resources, in accordance with embodiments of the present invention;

FIG. 4 provides a flow diagram illustrating a process flow for analyzing historical events to calculate impact of multi-system event impact and, in response, allocate resources, in accordance with embodiments of the present invention;

FIG. 5 provides a screenshot of an administrator interface enabled by embodiments of the invention; and FIG. 6 provides a screenshot of an administrator interface enabled by embodiments of the invention.

DETAILED DESCRIPTION OF EMBODIMENTS OF THE INVENTION

Embodiments of the invention provide for analyzing historical events to calculate the impact of multi-system events and, in response, allocate resources. Embodiments determine a multi-system event is occurring based on historical multi-system event data; correlate the multi-system event with one or more predicted resource allocation results of the multi-system event based on historical multi-system event data; and in response to the correlation, initiate mitigation of the one or more predicted resource allocation results, including re-allocation of at least one affected resource to a new system. Some also determine current consumption of a resource utilized by a service; determine current processing throughput; calculate a relationship between consumption of the resource and processing throughput; determine the service is impacted by the multi-system event; calculate expected processing throughput in response to the multi-system event; and calculate expected consumption of the resource based on the calculated expected processing throughput and the calculated relationship. And some also initiate re-allocation of resources to account for the calculated expected consumption of the resource.

In some applications, embodiments of the invention may be implemented as part of an entity's resolution planning, or in other words, planning of the possibility that an entity is split by way of merger, acquisition or government mandate. In such situations, there may be a single system of processing, memory, virtual and other electronic resources that must also be split into multiple components and retain functionality. In some situations such a system includes multiple sub-systems, which may be referred to herein collectively as a multi-system. In some such situations, the multi-system shares processing and/or memory resources and these resources must be re-allocated given a multi-system event, such as a "split" of entity programming such as among distinct lines of business (without split of the entity itself) or in some cases, the split or merger of the entity itself. Embodiments of the invention effectively provide for solutions to such situations. In some embodiments, the resources also include human capital or other non-electronic resources and predicting attrition or hiring may be incorporated into the system.

Because of the historical manual process for predicting resource allocation provided occurrence of certain events, the ability to determine service impacts and gather insight for recovery and resolution/mitigation at the time of a service-disrupting event is historically prohibitive. Such manual processes were prone to error and non-repeatable. Outputs to the process were typically in a non-structured data format such as a PDF with verbose explanations making consumption difficult. As discussed above, embodiments of the invention provide an event impact calculator that produces calculations for business continuity of services under stress in areas such as electronic resources, staffing, costs, real estate and other consumed resources.

In various embodiments, inputs to the calculator include the impacted service(s), current consumption of resources, current throughputs, expected throughputs and impacts to technology volumes, staffing attrition, customer attrition, business requirements and the like. Embodiments of the invention produce an event impacts report with numerical resource impact information, as well as plans and playbooks for mitigation/resolution. Examples of event impact reports are provided in FIGS. 5 and 6. Embodiments of the invention enable the ability to calculate resource impacts and requirements to continue to provide service(s) that are fit-for-purpose at the time of a disruption. The system also has the ability to assemble data quickly into an easy-to-consume output. Embodiments of the invention are particularly applicable in situations where a multi-system or single system is fragmented or severed and/or where an entity is fragmented or severed.

Such non-traditional concepts provide a technical improvement over existing technology in the data gathering, analysis and problem mitigation fields of art by enabling, in certain embodiments of the invention, a spoke and hub environment whereby spoke systems and their connections with a hub system provide for intelligent collection of data, such as historical resource utilization data. For example, resource data may come from a variety of disparate sources, servers, systems and the like. In various embodiments, multiple channels or only one channel is used for data moving from its source to its destination at a "hub" that collects, and in some cases, analyzes the data. In some cases, only those channels with relevant information are used. This may be determined based on user input or based on communications from spoke control systems such as a business group's server sending instructions to the hub system to configure and/or activate a communication channel with a spoke system so that relevant information may be communicated across the channel. In some cases, when the spoke control system detects that new information or otherwise relevant information may be available at one or more spoke systems, the spoke control system sends control signals that cause the hub system to establish a dedicated communication channel between the hub system and the one or more spoke systems that may have relevant information. In some cases, the dedicated communication channel is optimized so that the information may be communicated more efficiently than it could be over a non-dedicated communication channel. For example, a non-dedicated communication channel may utilize insecure network connections or systems or may utilize unstable or noise-prone network connections or systems. Thus, when establishing a dedicated communication channel, the hub system may optimize parameters of the dedicated communication channel such that the communication channel is less prone to interruption from security breach, other traffic, offline systems or the like. This may be done by, for example, designating certain systems on the network between the hub system and the various spoke systems, respectively, as low-functioning, medium-functioning, or high-functioning network systems/hubs/connections/channels (collectively referred to as network systems). In various other embodiments, the number of categories of systems may be raised or lowered. For example, there may be five (5) distinct categories of systems. The various network systems may be categorized by one or more administrators and/or automatically based on one or more monitoring modules or applications running on the hub and/or spoke systems. Such a monitoring system may flag any abnormalities in network communication such as an unintended offline network system, a security breach of a network system, a network communication affected negatively by noise or interference (in some cases based on a predetermined threshold of interference or communication errors). Thus, once various network systems are categorized, the spoke control systems and/or the hub system may optimize the dedicated communication channel by selecting appropriately categorized network systems for the communication channel. For example, the hub system may establish a dedicated communication channel in order to receive information associated with high priority work (as indicated by a spoke control system, for example, in its control signals to the hub system). When establishing the dedicated communication channel, the hub system may only select high-functioning network systems in order to ensure that the high priority information may be reliably communicated from the spoke system(s) to the hub system. In another example, certain spoke systems are designated or categorized and always provided a dedicated (or non-dedicated) communication channel based on their respective categorization.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Referring now to FIG. 1, the figure illustrates a processing system environment 100, in accordance with some embodiments of the invention. The environment 100 includes a user device 111 associated or used with authorization of a user 110 (e.g., a system administrator, entity administrator or the like), a third party system 160, and an entity system 140. In some embodiments, the third party system 160 corresponds to a third party entity. The environment 100 further includes one or more third party systems 192 (e.g., a partner, agent, or contractor associated with an entity), one or more other entity managing systems 194 (e.g., a third party system configured to provide instructions to entity systems, etc.), and one or more other external systems 196.

The systems and devices communicate with one another over the network 130 and perform one or more of the various steps and/or methods according to embodiments of the disclosure discussed herein. The network 130 may include a local area network (LAN), a wide area network (WAN), and/or a global area network (GAN). The network 130 may provide for wireline, wireless, or a combination of wireline and wireless communication between devices in the network. In one embodiment, the network 130 includes the Internet.

The user device 111, the third party system 160, and the entity system 140 each includes a computer system, server, multiple computer systems and/or servers or the like. The entity managing system 140, in the embodiments shown has a communication device 142 communicably coupled with a processing device 144, which is also communicably coupled with a memory device 146. The processing device 144 is configured to control the communication device 142 such that the entity system 140 communicates across the network 130 with one or more other systems. The processing device 144 is also configured to access the memory device 146 in order to read the computer readable instructions 148, which in some embodiments includes one or more applications such as applications 150 and 151. The memory device 146 also includes a datastore 154 or database for storing pieces of data that can be accessed by the processing device 144.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 114, 144, or 164 may further include functionality to operate one or more software programs based on computer-executable program code thereof, which may be stored in a memory. As the phrase is used herein, a processing device 114, 144, or 164 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 146 includes any computer memory that provides an actual or virtual space to temporarily or permanently store data and/or commands provided to the processing device 144 when it carries out its functions described herein.

The user device 111 includes a communication device 112 communicably coupled with a processing device 114, which is also communicably coupled with a memory device 116. The processing device 114 is configured to control the communication device 112 such that the user device 111 communicates across the network 130 with one or more other systems. The processing device 114 is also configured to access the memory device 116 in order to read the computer readable instructions 118, which in some embodiments includes application 120 and online entity application 121. The memory device 116 also includes a datastore 122 or database for storing pieces of data that can be accessed by the processing device 114. The user device 111 may be a mobile device of the user 110, or other computing device.

The third party system 160 includes a communication device 162 communicably coupled with a processing device 164, which is also communicably coupled with a memory device 166. The processing device 164 is configured to control the communication device 162 such that the third party system 160 communicates across the network 130 with one or more other systems. The processing device 164 is also configured to access the memory device 166 in order to read the computer readable instructions 168, which in some embodiments includes an application 170. The memory device 166 also includes a datastore 172 or database for storing pieces of data that can be accessed by the processing device 164.

In some embodiments, the application 120, the entity application 121, and the application 170 interact with the application 150 or 151 to receive or provide historical resource data, analyze the historical resource data, and implement processes as discussed herein. The applications 150 and 151 may be a suite of applications for performing these functions.

In some embodiments, the application 120, the entity application 121, and the application 170 interact with the applications 150 and 151 to utilize metadata to determine decisions for processing.

The applications 120, 121, 150, 151, and 170 are for instructing the processing devices 114, 144 and 164 to perform various steps of the methods discussed herein, and/or other steps and/or similar steps. In various embodiments, one or more of the applications 120, 121, 150, 151, and 170 are included in the computer readable instructions stored in a memory device of one or more systems or devices other than the systems 160 and 140 and the user device 111. For example, in some embodiments, the application 120 is stored and configured for being accessed by a processing device of one or more third party systems 192 connected to the network 130. In various embodiments, the applications 120, 121, 150, 151, and 170 stored and executed by different systems/devices are different. In some embodiments, the applications 120, 121, 150, 151, and 170 stored and executed by different systems may be similar and may be configured to communicate with one another, and in some embodiments, the applications 120, 121, 150, 151, and 170 may be considered to be working together as a singular application despite being stored and executed on different systems.

In various embodiments, one of the systems discussed above, such as the entity system 140, is more than one system and the various components of the system are not collocated, and in various embodiments, there are multiple components performing the functions indicated herein as a single device. For example, in one embodiment, multiple processing devices perform the functions of the processing device 144 of the entity managing system 140 described herein. In various embodiments, the entity system 140 includes one or more of the external systems 196 and/or any other system or component used in conjunction with or to perform any of the method steps discussed herein. For example, the entity system 140 may include a hub system in operative connection with a number of sub-systems, which may be referred to herein as a multi-system.

In various embodiments, the entity system 140, the third party system 160, and the user device 111 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

Referring now to FIG. 2, a flowchart illustrates a method 200 for analyzing historical events to calculate impact of multi-system event impact and, in response, allocate resources. The first step, as represented by block 210, is for the system to determine a multi-system event is occurring based on historical multi-system event data. The next step, as represented by block 220, is to correlate the multi-system event with one or more predicted resource allocation results of the multi-system event based on historical multi-system event data. The next step, as represented by block 230, is for the system to initiate, in response to the correlation, mitigation of the one or more predicted resource allocation results. This may, in some embodiments, include re-allocation of at least one affected resource to a new system.

Referring now to FIG. 3, a flowchart illustrates a method 300 including additional steps for analyzing historical events to calculate impact of multi-system event impact and, in response, allocate resources according to embodiments of the invention. The first step, as illustrated by block 310, is to determine current consumption of a resource utilized by a service. The next step, as represented by block 320, is to determine current processing throughput. The next step, as represented by block 330, is to calculate a relationship between consumption of the resource and processing throughput. The next step, as represented by block 340, is to determine the service is impacted by the multi-system event. The next step, as represented by block 350, is to calculate expected processing throughput in response to the multi-system event. The next step, as represented by block 360, is to calculate expected consumption of the resource based on the calculated expected processing throughput and the calculated relationship.

Referring now to FIG. 4, a flowchart illustrates a method 400 including additional and/or alternative steps for analyzing historical events to calculate impact of multi-system event impact and, in response, allocate resources. The first step, as represented by block 410, is to initiate presentation of the calculated expected consumption of the resources to an administrator. The next step, as represented by block 420, is to calculate a re-allocation of resources to account for the calculated expected consumption of the resource. The next step, as represented by block 430, is to initiate presentation of the calculated re-allocation of resources for administration approval. The next step, as represented by block 440, is to receive administrator approval for implementing the re-allocation of resources. Finally, the next step, as represented by block 450, is to initiate, in response, re-allocation of resources.

Referring now to FIGS. 5 and 6, screenshots 500 and 600 of the event calculator administrator interface are shown. Screenshot 500 illustrates recital of information related to the relevant service, the service level agreements (SLAs), key performance indicators (KPIs), the resources required for the service, such as dedicated and shared people, apps, technology instances, contracts/vendors, real estate, and regulation resources. There is a calculation for consumption of the resources as well as cost. Notably, an Impact at Intervals graph is an illustration of the level of impact to a particular resource over time provided the occurrence of the event or disruption. Screenshot 600 illustrates an administrator response resource report for a particular service. The threats that are applicable to the service, response teams, SLA, and KPI maximum impact are shown. For a particular resource, a graph illustrates the impact of a particular event or disruption to the service over time and provides a weekly plan showing current resource level, expected attrition, amount of the resource required to maintain throughput and the calculated variance. This variance may be considered a gap requiring mitigation or resolution, for example, automatic re-allocation of resources from other services or systems.

In various embodiments, the calculator implements a smart contract. Smart contracts are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others. The smart contract may map back to the intervals, automate the logic of an agreement, implement allocation for services and/or reverse allocation for services, increase or decrease services being provided in response to events/disruptions and the like. In some embodiments, feedback from the smart contract may enable measurement of the entity's ability to respond in certain situations.

In some embodiments, the correlation algorithm is configured to determine whether circumstances corresponding to the collected data are likely to cause the potential issue, thereby resulting in at least one likelihood of causation. A "likelihood of causation" may correspond to only one nexus as well as a collected-data-potential-issue pair. Furthermore, the correlation algorithm may be configured to determine a level of causation. The "level of causation" may correspond to a combination of all of the nexuses and all collected-data-potential-issue pairs. Thus, in some embodiments, the level of causation may be a summation or variation on a summation of each of the likelihoods of causation. For example, if a collected-data-potential-issue pair has multiple potential nexuses with the potential issue, then each of the multiple nexuses will have a corresponding likelihood of causation, which may be combined (e.g., summed) to determine the overall level of causation of the collected-data-potential-issue pair. Thus, each pair may be compared and ranked. Then, the system may determined recommendations to mitigate the highest ranked pair. For example, if the collected data indicates a trend of resource utilization by a particular service and the level of causation is high for that resource utilization being caused by an increase in throughput, then the system may develop recommendations configured for mitigating the impact of a multi-system event or disruption given the correlation. For example, the system may recommend that additional resources are allocated when a disruption event is detected. In some instances, the mitigation may be automatically carried out if possible, such as automatically re-allocating resources when a correlated event or disruption is detected or predicted.

Each communication interface described herein, including the communication devices 142, 112 and 162, generally includes hardware, and, in some instances, software, that enables a portion of the system 100, such as the processor 144 to transport, send, receive, and/or otherwise communicate information. For example, the communication interface 112 of the user device 111 may include a modem, server, electrical connection, and/or other electronic device that operatively connects the user device 111 to another electronic device, such as the electronic devices that make up the entity system 140.

Each processor described herein, including the processor 144, 114 and 164, generally includes circuitry for implementing the audio, visual, and/or logic functions of that portion of the system 100. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as the memory 146, 116 and 166.

Each memory device described herein, including the memory 146, 116 and 166 for storing applications and data, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

It will be understood that the embodiment illustrated in FIG. 1 is exemplary and that other embodiments may vary. For example, in some embodiments, some of the portions of the system 100 may be combined into single portion. Specifically, in some embodiments, the entity system 140 is configured to perform some of the same functions of those separate portions as described and/or contemplated herein. Likewise, in some embodiments, some or all of the portions of the entity system 140 may be separated into two or more distinct portions.

In some embodiments, the system may allow the administrator to provide preferences for different scenarios of resource allocation or in certain disruptions. For example, the system may enable the administrator to specify that the administrator prefers the cheapest option, the fastest option, the best balance between the cheapest and fastest option or otherwise. In some cases, the system enables the administrator to establish these preferences before occurrence of an event or disruption and in some cases, the system enables the administrator to provide these preferences "on-the-fly" or during operation of the system.

In various embodiments, the potential issue, rather than a problem, is an opportunity. For example, the system may recognize that a particular event increases throughput for a particular service and such increase requires resource re-allocation. Such re-allocation may include allocation of additional resources to the service to account for the increase in service.

In various embodiments, not only virtual resources, but human resources may be shared. Thus, the allocation and re-allocation of resources may include allocation and re-allocation of shared human resources. In various embodiments, the system receives feedback from the output(s) of the system including whether the resources re-allocated were sufficient for the expected throughput given the service(s) being provided. For example, in a case where too few of a particular resource were re-allocated given a predicted need, then in a future operation of the system, the system may provide for re-allocation of resources. Such an increase may be based on an actual known amount of additional resources needed (or average amount of additional resources needed) or may be based on a predetermined threshold amount such as 5% or 10% over the amount re-allocated previously. In some cases, it may be based on an actual or average number of additional needed plus a predetermined buffer amount or percentage. Similarly, if too many resources were re-allocated based on a particular predicted situation, then feedback to the system may indicate that fewer resources should be allocated in future similar situations. For example, in some situations, the system may decrease the number of resources re-allocated in similar future situations by an actual amount of extra resources in a previous situation (or average amount of extra resources in previous situations) or may be based on a predetermined threshold amount such as 5% or 10% under the amount re-allocated previously. In some cases, it may be based on an actual or average number of fewer needed plus a predetermined buffer amount or percentage.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present invention may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While certain exemplary embodiments have been described and shown in the accompanying drawings, it is to be understood that such embodiments are merely illustrative of, and not restrictive of, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for analyzing historical events to calculate impact of multi-system event impact and, in response, allocate resources, the system comprising:

a computer apparatus including a processor, a memory device, and a communication device; and a software module stored in the memory, comprising computer-readable instructions that when executed by the processor cause the processor to:

determine a multi-system event is occurring based on historical multi-system event data;

retrieve resource data from one or more disparate source systems by:

designating each of the one or more source systems as low functioning, medium functioning or high functioning based on applications running on the one or more source systems;

detecting presence of new information at a source system of the one or more source systems; and establishing a dedicated communication channel between a hub system and the source system based on receiving control signals from a control system, wherein establishing the dedicated communication channel comprises determining that the control signals are associated with a predetermined high priority and that the source system is a high functioning system based on relevance of the new information at the source system with the multi-system event;

wherein the retrieved resource data comprises the historical multi-system event data, wherein the multi-system event is associated with disruption of a service;

determine one or more predicted resource allocation results of the multi-system event based on historical multi-system event data, wherein the one or more predicted resource allocation results comprise a current resource level of a resource, determined expected attrition of the resource due to the multi-system event, a determined amount of resource required to maintain processing throughput, and determined variance gap between the current resource level and the determined amount of resource required; and in response to identifying that the variance gap requires mitigation of the one or more predicted resource allocation results, initiate mitigation of the one or more predicted resource allocation results-by allocating additional resources from a new system;

determine that an amount of the additional resources is greater than the determined required amount of the resource by more than a predetermined threshold amount, wherein the determined required amount of the resource comprises a sum of an average consumption of the resource and a buffer amount;

decrease the amount of the additional resources and provide feedback to the source system for future occurrences of multi-system events.

2. The system of claim 1, wherein determining the one or more predicted resource allocation results further comprises:
determining current consumption of the resource utilized by the service;
determining current processing throughput of the resource;
calculating a relationship between consumption of the resource and processing throughput;
determining that the service is impacted by the multi-system event;
calculating expected processing throughput in response to the multi-system event; and
determining the expected attrition of the resource due to the multi-system event by calculating expected consumption of the resource based on the calculated expected processing throughput and the calculated relationship.

3. The system of claim 2, wherein the computer-readable instructions when executed by the processor further cause the processor to:
initiate re-allocation of resources to account for the calculated expected consumption of the resource.

4. The system of claim 2, wherein the computer-readable instructions when executed by the processor further cause the processor to:
initiate presentation of the calculated expected consumption of the resource to an administrator; and
receive instructions from the administrator regarding desired mitigation.

5. The system of claim 1, wherein the computer-readable instructions when executed by the processor further cause the processor to:
determine that an amount of the additional resources is greater than a required amount of the resource by more than a predetermined threshold amount, wherein the required amount of the resource comprises a sum of an average consumption of the resource and a buffer amount; and
decrease the amount of the additional resources.

6. The system of claim 1, wherein designating each of the one or more source systems further comprises:
flagging one or more abnormalities associated with network communication of the source system, the one or more abnormalities comprising an unintended offline source system, a security breach of the source system, and/or network communication having noise above a predetermined threshold of interference,
wherein establishing the dedicated communication channel further comprises:
optimizing network communication parameters of the dedicated communication channel such that the dedicated communication channel is structured for reducing interruption from a security breach, traffic noise or offline systems.

7. The system of claim 1, wherein the additional resources comprise an electronic processing resource or an electronic memory resource.

8. A computer program product for analyzing historical events to calculate impact of multi-system event impact and, in response, allocate resources, the computer program product comprising at least one non-transitory computer-readable medium having computer-readable program code portions embodied therein, the computer-readable program code portions comprising:

an executable portion configured to determine a multi-system event is occurring based on comparing with historical multi-system event data;
an executable portion configured to retrieve resource data from one or more disparate source systems by:
designating each of the one or more source systems as low functioning, medium functioning or high functioning based on applications running on the one or more source systems;
detecting presence of new information at a source system of the one or more source systems; and
establishing a dedicated communication channel between a hub system and the source system based on receiving control signals from a control system, wherein establishing the dedicated communication channel comprises determining that the control signals are associated with a predetermined high priority and that the source system is a high functioning system based on relevance of the new information at the source system with the multi-system event;
an executable portion configured to wherein the retrieved resource data comprises the historical multi-system event data, wherein the multi-system event is associated with disruption of a service;
an executable portion configured to determine one or more predicted resource allocation results of the multi-system event based on historical multi-system event data, wherein the one or more predicted resource allocation results comprise a current resource level of a resource, determined expected attrition of the resource due to the multi-system event, a determined amount of resource required to maintain processing throughput, and determined variance gap between the current resource level and the determined amount of resource required; and
an executable portion configured to, in response to identifying that the variance gap requires mitigation of the one or more predicted resource allocation results, initiate mitigation of the one or more predicted resource allocation results by allocating additional resources from a new system;
an executable portion configured to determine that an amount of the additional resources is greater than the determined required amount of the resource by more than a predetermined threshold amount, wherein the determined required amount of the resource comprises a sum of an average consumption of the resource and a buffer amount;
an executable portion configured to decrease the amount of the additional resources and provide feedback to the source system for future occurrences of multi-system events.

9. The computer program product of claim 8, wherein determining the one or more predicted resource allocation results further comprises:
determining current consumption of the resource utilized by the service;
determining current processing throughput of the resource;
calculating a relationship between consumption of the resource and processing throughput;
determining that the service is impacted by the multi-system event;
calculating expected processing throughput in response to the multi-system event; and
determining the expected attrition of the resource due to the multi-system event by calculating expected consumption of the resource based on the calculated expected processing throughput and the calculated relationship.

10. The computer program product of claim 9, wherein the computer-readable program code portions further comprise:
an executable portion configured to initiate re-allocation of resources to account for the calculated expected consumption of the resource.

11. The computer program product of claim 9, wherein the computer-readable program code portions further comprise:
an executable portion configured to initiate presentation of the calculated expected consumption of the resource to an administrator; and
an executable portion configured to receive instructions from the administrator regarding desired mitigation.

12. The computer program product of claim 8, wherein the computer-readable program code portions further comprise:
an executable portion configured to determine that an amount of the additional resources is greater than a required amount of the resource by more than a predetermined threshold amount, wherein the required amount of the resource comprises a sum of an average consumption of the resource and a buffer amount; and
an executable portion configured to decrease the amount of the additional resources.

13. The computer program product of claim 8, wherein designating each of the one or more source systems further comprises:
flagging one or more abnormalities associated with network communication of the source system, the one or more abnormalities comprising an unintended offline source system, a security breach of the source system, and/or network communication having noise above a predetermined threshold of interference,
wherein establishing the dedicated communication channel further comprises:
optimizing network communication parameters of the dedicated communication channel such that the dedicated communication channel is structured for reducing interruption from a security breach, traffic noise or offline systems.

14. The computer program product of claim 8, wherein the allocated additional resources comprise an electronic processing resource or an electronic memory resource.

15. A method for analyzing historical events to calculate impact of multi-system event impact and, in response, allocate resources, the method comprising:
determining, using the processing device, a multi-system event is occurring based on comparing with historical multi-system event data;
retrieving, using a processing device, resource data from one or more disparate source systems by:
designating each of the one or more source systems as low functioning, medium functioning or high functioning based on applications running on the one or more source systems;
detecting presence of new information at a source system of the one or more source systems; and
establishing a dedicated communication channel between a hub system and the source system based on receiving control signals from a control system, wherein establishing the dedicated communication channel comprises determining that the control signals are associated with a predetermined high priority and that the source system is a high functioning system based on relevance of the new information at the source system with the multi-system event;
wherein the retrieved resource data comprises the historical multi-system event data, wherein the multi-system event is associated with disruption of a service;
determining, using the processing device, one or more predicted resource allocation results of the multi-system event based on historical multi-system event data, wherein the one or more predicted resource allocation results comprise a current resource level of a resource, determined expected attrition of the resource due to the multi-system event, a determined amount of resource required to maintain processing throughput, and determined variance gap between the current resource level and the determined amount of resource required; and
in response to identifying that the variance gap requires mitigation of the one or more predicted resource allocation results, initiating, using the processing device, mitigation of the one or more predicted resource allocation results by allocating additional resources from a new system
determine that an amount of the additional resources is greater than the determined required amount of the resource by more than a predetermined threshold amount, wherein the determined required amount of the resource comprises a sum of an average consumption of the resource and a buffer amount;
decrease the amount of the additional resources and provide feedback to the source system for future occurrences of multi-system events.

16. The method of claim 15, wherein determining the one or more predicted resource allocation results further comprises:
determining, using the processing device, current consumption of the resource utilized by the service;
determining, using the processing device, current processing throughput of the resource;
calculating, using the processing device, a relationship between consumption of the resource and processing throughput;
determining, using the processing device, that the service is impacted by the multi-system event;
calculating, using the processing device, expected processing throughput in response to the multi-system event; and
determining the expected attrition of the resource due to the multi-system event by calculating, using the processing device, expected consumption of the resource based on the calculated expected processing throughput and the calculated relationship.

17. The method of claim 16, further comprising:
initiating, using the processing device, re-allocation of resources to account for the calculated expected consumption of the resource.

18. The method of claim 16, further comprising:
initiating, using the processing device, presentation of the calculated expected consumption of the resource to an administrator; and
receiving, using the processing device, instructions from the administrator regarding desired mitigation.

19. The method of claim 15, further comprising:
determining, using the processing device, that an amount of the additional resources is greater than a required amount of the resource by more than a predetermined threshold amount, wherein the required amount of the resource comprises a sum of an average consumption of the resource and a buffer amount; and decreasing, using the processing device, the amount of the additional resources.

20. The method of claim 15, wherein designating each of the one or more source systems further comprises flagging one or more abnormalities associated with network communication of the source system, the one or more abnormalities comprising an unintended offline source system, a security breach of the source system, and/or network communication having noise above a predetermined threshold of interference; and wherein establishing the dedicated communication channel further comprises optimizing network communication parameters of the dedicated communication channel such that the dedicated communication channel is structured for reducing interruption from a security breach, traffic noise or offline systems.

* * * * *